(12) United States Patent
G

(10) Patent No.: US 12,189,471 B2
(45) Date of Patent: *Jan. 7, 2025

(54) DATA INTEGRITY VERIFICATION IN DIRECT MEMORY ACCESS (DMA) TRANSFER

(71) Applicant: TEXAS INSTRUMENTS INCORPORATED, Dallas, TX (US)

(72) Inventor: Anand Kumar G, Bengaluru (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/381,320

(22) Filed: Oct. 18, 2023

(65) Prior Publication Data

US 2024/0045761 A1   Feb. 8, 2024

Related U.S. Application Data

(63) Continuation of application No. 17/378,570, filed on Jul. 16, 2021, now Pat. No. 11,829,238.

(30) Foreign Application Priority Data

Apr. 22, 2021 (IN) .............................. 202141018561

(51) Int. Cl.
| G06F 11/10 | (2006.01) |
| G06F 11/00 | (2006.01) |
| G06F 13/00 | (2006.01) |
| G06F 13/28 | (2006.01) |

(52) U.S. Cl.
CPC .......... *G06F 11/1004* (2013.01); *G06F 13/28* (2013.01)

(58) Field of Classification Search
CPC ............................. G06F 11/1004; G06F 13/28
See application file for complete search history.

(56) References Cited

U.S. PATENT DOCUMENTS

| 5,974,574 | A | 10/1999 | Lennie et al. |
| 8,504,517 | B2 | 8/2013 | Agrawal |
| 8,898,394 | B2 | 11/2014 | Kondo et al. |
| 11,354,244 | B2* | 6/2022 | Banerjee ............. G06F 12/0835 |
| 11,368,251 | B1 | 6/2022 | Chandrasekher et al. |
| 11,604,739 | B2* | 3/2023 | Fellinger .......... H03K 19/17728 |
| 11,620,255 | B2* | 4/2023 | Kasichainula ...... H04L 12/4645 |
| | | | 709/212 |
| 11,755,223 | B2* | 9/2023 | Tiwari .................... G06F 1/263 |
| | | | 711/154 |
| 2008/0155007 | A1 | 6/2008 | Launer et al. |
| 2011/0040943 | A1 | 2/2011 | Kondo et al. |

* cited by examiner

*Primary Examiner* — Justin R Knapp
(74) *Attorney, Agent, or Firm* — Xianghui Huang; Frank D. Cimino

(57) ABSTRACT

In an example, a method includes copying data between a source device and a destination device to form first copied data. The method also includes, responsive to completion of the copying, performing a verify-read operation. The verify-read operation includes determining a first checksum of the first copied data, copying the data between the source device and the destination device to form second copied data, determining a second checksum of the second copied data, comparing the first checksum to the second checksum to determine a comparison result, and determining a data integrity validation result based on the comparison result.

20 Claims, 8 Drawing Sheets

DATA INTEGRITY VERIFICATION IN DIRECT MEMORY ACCESS (DMA) TRANSFER

CROSS-REFERENCE TO RELATED APPLICATIONS

The application is a continuation of U.S. patent application Ser. No. 17/378,570, filed Jul. 16, 2021, which claims priority to India Provisional Patent Application No. 202141018561, entitled "Hardware Implementations In DMA And FIFO Based Peripherals For Functional Safety," filed Apr. 22, 2021, all of which are hereby incorporated herein by reference in their entirety.

BACKGROUND

Some application environments utilize functional safety compliant hardware. Functional safety compliant hardware may be hardware designed to provide an increased level of data integrity and reliability, such as in safety related applications. Some examples of safety related applications may include automotive or other vehicular environments, industrial automation and/or control, and/or electrical safety applications (e.g., circuit breakers, protection relays, etc.).

SUMMARY

In an example, an apparatus includes a source device and a direct memory access (DMA) component comprising a data buffer and coupled to the source device. The DMA component is configured to copy data from the source device to the data buffer to form first stored data, determine a first checksum of the first stored data, copy the data from the source device to the data buffer again to form second stored data, determine a second checksum of the second stored data, compare the first checksum to the second checksum to determine a comparison result, and determine data integrity validation based on the comparison result.

In an example, an apparatus includes a peripheral device and a direct memory access (DMA) component comprising a data buffer, control logic, and a checksum generator. The DMA component is configured to couple to a source device. The control logic of the DMA component configured to copy data from the source device to the data buffer to form first stored data, cause the checksum generator to determine a first checksum of the first stored data, copy the data from the source device to the data buffer again to form second stored data, cause the checksum generator to determine a second checksum of the second stored data, compare the first checksum to the second checksum to determine a comparison result, and determine data integrity validation based on the comparison result.

In an example, a method includes copying data between a source device and a destination device to form first copied data. The method also includes, responsive to completion of the copying, performing a verify-read operation. The verify-read operation includes determining a first checksum of the first copied data, copying the data between the source device and the destination device to form second copied data, determining a second checksum of the second copied data, comparing the first checksum to the second checksum to determine a comparison result, and determining a data integrity validation result based on the comparison result.

BRIEF DESCRIPTION OF THE DRAWINGS

The same reference numbers (or other feature designators) are used in the drawings to designate the same or similar (functionally and/or structurally) features.

DETAILED DESCRIPTION

Some approaches for verifying data integrity may be performed through software-based processes. For example, following a data read or a data write, software may read the data a second time, or read the written data, and compare the read data to the data that was first read or written, respectively. However, such a software-based process may place a large processing burden on a central processing unit performing the verification, increasing power consumption in a system that performs the verification. The software-based process may also have a complicated development and testing process.

Aspects of this disclosure provide for hardware-based data integrity verification. The hardware-based data integrity verification may be performed for data transfers, such as direct memory access (DMA) transfers, between memory devices (e.g., random access memory and flash, etc.). The hardware-based data integrity verification may be performed for data transfers between memory devices and peripheral devices. The hardware-based data integrity verification may be performed for data transfers between peripheral devices. In at least some examples, the peripheral devices are first-in, first-out (FIFO) based devices.

In some examples, the data may be copied from a source device to a destination device. At least one of the source device or the destination device is a DMA component having a buffer. A first checksum may be calculated for data provided in the buffer of the DMA component and stored in a first register. Subsequently, a verify read may be performed to replace the contents of the buffer of the DMA component with the data that was just copied by the DMA component. In some examples, the verify read may read the data from the source in the source-destination copy scheme. In other examples, the verify read may read the data from the destination device in the source-destination copy scheme. A second checksum may be calculated for the data provided in the buffer of the DMA component and the first and second checksums may be compared. If the checksums match, the data copying passed the data integrity verification and operation continues. If the checksums do not match, the data copying failed the data integrity verification and a fault notification is provided. In at least some examples, a peripheral device functioning as the source device or the destination device includes a FIFO buffer that has a pointer indicating a read location, or a write location, of the FIFO buffer. In some implementations, a second pointer is added to the FIFO buffer as a verify-read pointer. The verify-read pointer may trail the pointer of the FIFO buffer such that the pointer of the FIFO buffer increments as data is written to, or read from, the FIFO buffer during the copying operation and the verify-read pointer increments as data is read from the FIFO buffer during the data integrity verification.

Figure 1:
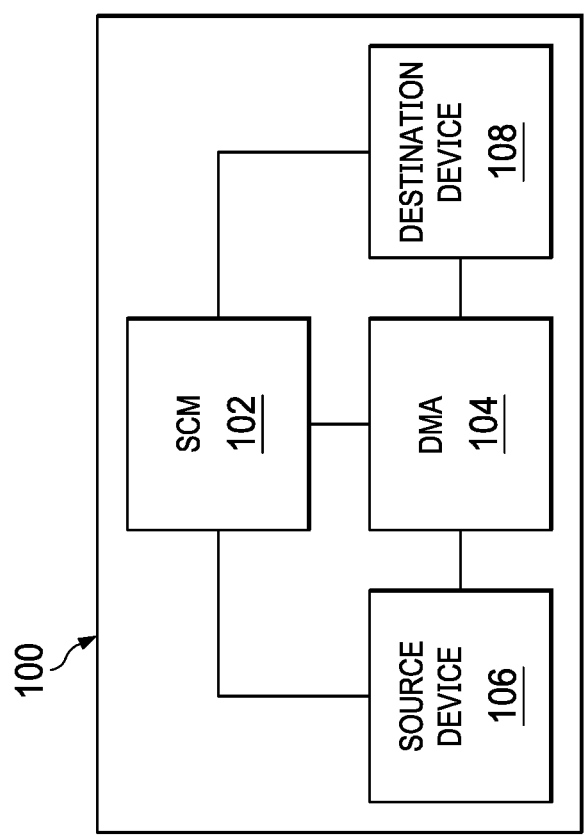
FIG. 1 is a block diagram of a data transfer system in accordance with various examples.

FIG. 1 is a block diagram of a system 100 in accordance with various examples. In at least some examples, the system 100 is representative of an integrated circuit or system on a chip (SOC). In some examples, the system 100 may be suitable for a functional safety application such that at least some components of the system 100 are functional safety compliant hardware. In some examples, the system 100 includes a system control module (SCM) 102, a DMA 104, a source device 106, and a destination device 108. The SCM may be coupled to at least some of the DMA 104, the source device 106, and/or the destination device 108. The source device 106 and the destination device 108 may each be coupled to the DMA 104. The source device 106 and the destination device 108 may each be a memory device (e.g., flash, random access memory (RAM) such as static RAM (SRAM), etc.) or a peripheral device (such as a digital-to-analog converter (DAC), an analog-to-digital converter (ADC), etc.).

In an example of operation of the system 100, a data bit, such as a safety enable bit, may be asserted (e.g., "set") in a safety register of the SCM 102. In some examples, the register may be an Enable Safety register. The safety enable bit may be set in the SCM 102 according to any suitable process and according to any suitable control signal or trigger event, received from any suitable source, the scope of which is not limited herein. Responsive to assertion of the safety enable bit, the SCM 102 may provide an asserted safety active signal, that is otherwise de-asserted, to at least some components of the system 100. For example, the SCM 102 may provide the safety active signal to the DMA 104. The SCM 102 may also provide the safety active signal to the source device 106 and/or the destination device 108, when the respective source device 106 or destination device 108 is a peripheral device. Responsive to assertion of the safety enable signal, the DMA 104, source device 106, and/or destination device 108 may perform data integrity verification as described herein.

For example, subsequent to the DMA 104 moving data, either from the source device 106 to a buffer of the DMA 104 described in more detail below, or from the buffer of the DMA 104 to the destination device 108, the DMA 104 may initiate a verify-read operation. The verify-read operation may be performed automatically following the DMA 104 writing data to the buffer of the DMA 104 or the destination device 104, such as without specific user initiation, based at least in part on the assertion of the safety enable signal. The verify-read operation may make a second copy, from the source device 106, of data copied from the source device 106 to the buffer of the DMA 104, or may make a new copy, from the destination device 108, of data copied from the buffer of the DMA 104 to the destination device 108. The DMA 104 may compute checksums of the data provided in the buffer of the DMA 104 during both the copy operation and the verify-read operation and may compare the checksums. If the checksums match, the copy operation passed the data integrity verification and operation continues. If the checksums do not match, the copy operation failed the data integrity verification and the DMA 104 provides a fault notification. In some examples, the fault notification is provided to the SCM 102. In other examples, the fault notification is provided to any other device or component (not shown). In examples of the system 100 in which the source device 106 and/or the destination device 108 are peripheral devices, the peripheral device includes a FIFO buffer (not shown) that has a pointer indicating a read location, or a write location, of the FIFO buffer. In some implementations, a second pointer is added to the FIFO buffer as a verify-read pointer. The verify-read pointer may trail the pointer of the FIFO buffer such that the pointer of the FIFO buffer increments as data is written to, or read from, the FIFO buffer during the copying operation and the verify-read pointer increments as data is read from the FIFO buffer during the data integrity verification, such as during the verify read operation.

Figure 2:
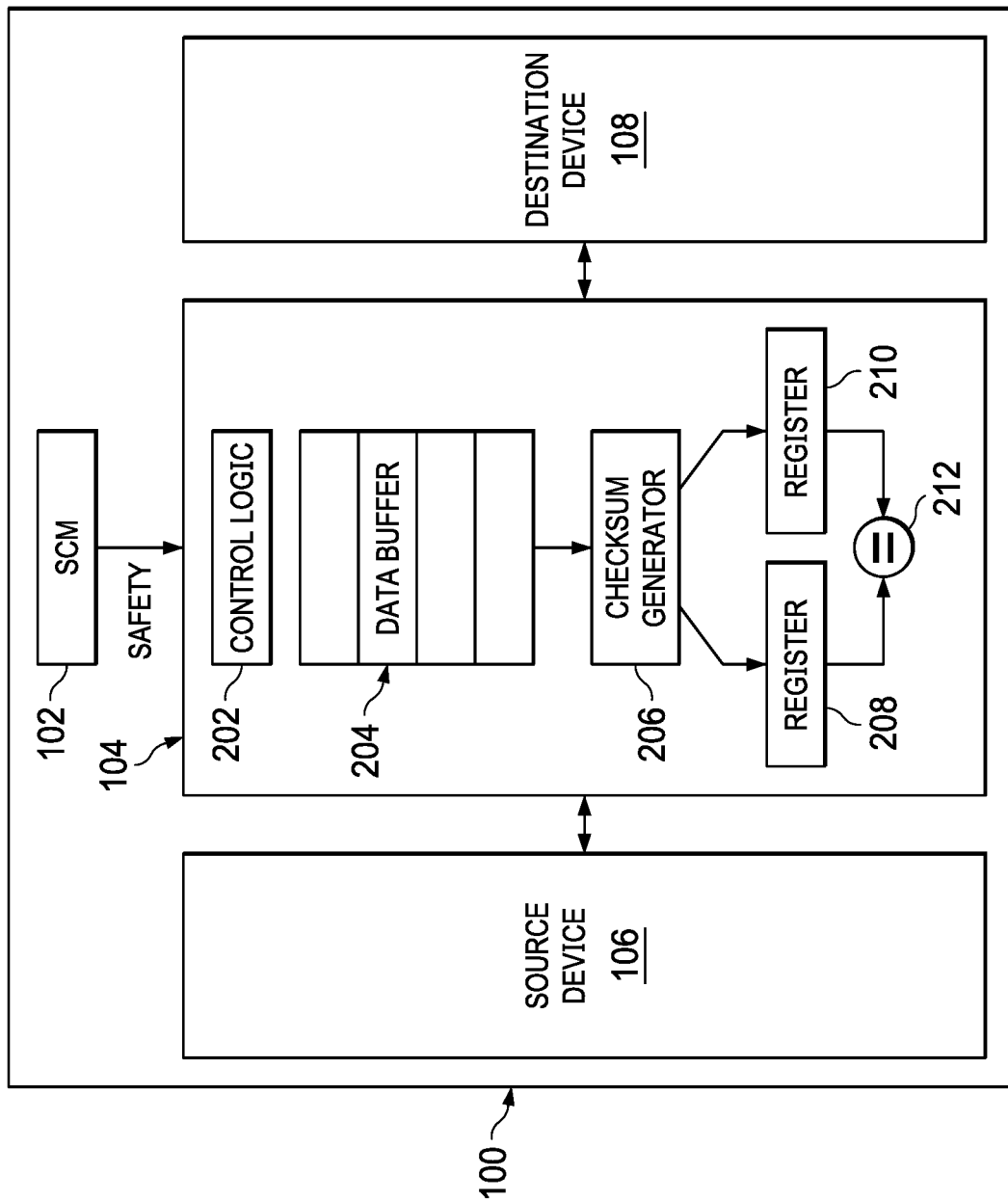
FIG. 2 is a block diagram of a data transfer system in accordance with various examples.

FIG. 2 is an implementation of the system 100 in which the source device 106 is a memory device and the destination device 108 is a memory device in accordance with various examples. For example, the source device 106 may be flash memory, RAM memory, or any other suitable memory device. Similarly, the destination device 108 may be flash memory, RAM memory, or any other suitable memory device. In at least some examples, the DMA 104 includes control logic 202, a data buffer 204, a checksum generator 206, a register 208, a register 210, and comparison logic 212.

In an example of operation of the system 100 according to the implementation of FIG. 2, the DMA 104 reads data from the source device 106. The DMA 104 may read the data from the source device 106 responsive to the DMA 104 receiving a request, from the SCM 102 or any other suitable component (not shown) to copy data from the source device 106 to the destination device 108. The read data may be stored in the data buffer 204 in a copying operation. After the data from the source device 106 is copied to the data buffer 204, the control logic 202 may control the checksum generator 206 to generate and provide a checksum of the contents of the data buffer 204. The control logic 202 may also control the register 208 to store the checksum provided by the checksum generator 206. In various examples, the checksum generator 206 may be any hardware component or circuit suitable for, and capable of, generating and providing a checksum of received data, the scope of which is not limited herein.

Following the checksum being generated by the checksum generator 206 and/or stored in the register 208, the DMA 104 may perform a verify-read operation. For example, the control logic 202 may again copy the data from the source device 106 to the data buffer 204, possibly overwriting data previously stored in the data buffer 204, such as the older copy of the data from the source device 106. After the data from the source device 106 is copied to the data buffer 204, the control logic 202 may control the checksum generator 206 to generate and provide a checksum of the contents of the data buffer 204. The control logic 202 may also control the register 210 to store the checksum provided by the checksum generator 206. Following storing of the checksum in the register 210, the control logic 202 may control the comparison logic 212 to compare values stored and provided by the register 208 and the register 210 to perform data integrity verification. For example, the register 208 may contain a checksum of data copied from the source device 106 to the data buffer 204 during a copying operation and the register 210 may contain a checksum of data copied from the source device 106 to the data buffer 204 during a verify-read operation. If an error has occurred in the copying or a fault exists in the source device 106 or the DMA 104, the checksum values may not match. Responsive to the checksum values stored by the register 208 and the register 210 matching, the comparison logic 212 provides a comparison result indicating a match (e.g., a "pass" of the data integrity verification). Responsive to the checksum values stored by the register 208 and the register 210 not matching, the comparison logic 212 provides a comparison result indicating no match (e.g., a "fail" of the data integrity verification). The comparison result may be provided by the DMA 104 as a fault notification to any suitable component as dictated by specifications of the functional safety environment in which the system 100 is implemented. In at least some examples, responsive to failure of the data integrity verification, the DMA 104 may abandon the requested copy of data from the source device 106 to the destination device 108, erasing contents of the data buffer 204, register 208, and register 210. Responsive to passage of the data integrity verification, the DMA 104 may continue the requested copy of data from the source device 106 to the destination device 108.

To continue the requested copy of data from the source device 106 to the destination device 108, the control logic 202 may copy the contents of the data buffer 204 to the destination device 108 in a copying operation. After the data from the data buffer 204 is copied to the destination device 108, the DMA 104 may perform a verify-read operation. For example, the control logic 202 may copy the data from the destination device 108 back to the data buffer 204, possibly overwriting data previously stored in the data buffer 204, such as the contents copied to the destination device 108. After the data from the destination device 108 is copied back to the data buffer 204, the control logic 202 may control the checksum generator 206 to generate and provide a checksum of the contents of the data buffer 204. The control logic 202 may also control the register 210 to store the checksum provided by the checksum generator 206, overwriting any data previously stored in the register 210. Following storing of the checksum in the register 210, the control logic 202 may control the comparison logic 212 to compare values stored and provided by the register 208 and the register 210 to perform data integrity verification. For example, the register 208 may contain a checksum of data copied from the source device 106 to the data buffer 204 during a copying operation and the register 210 may contain a checksum of data copied from the destination device 108 to the data buffer 204 during a verify-read operation. If an error has occurred in the copying or a fault exists in the destination device 108 or the DMA 104, the checksum values may not match. Responsive to the checksum values stored by the register 208 and the register 210 matching, the comparison logic 212 provides a comparison result indicating a match (e.g., a "pass" of the data integrity verification). Responsive to the checksum values stored by the register 208 and the register 210 not matching, the comparison logic 212 provides a comparison result indicating no match (e.g., a "fail" of the data integrity verification). The comparison result may be provided by the DMA 104 as a fault notification to any suitable component as dictated by specifications of the functional safety environment in which the system 100 is implemented. In various examples, the fault notification may cause a device or component receiving the fault notification to take remedial action, such as causing the DMA 104 to perform the copy operation again, cause the destination device 106 to erase the data written to the destination device 106, ceasing operation of a system or device (e.g., such as a partial or full system shutdown), providing a notification to a user, etc.

Figure 3:
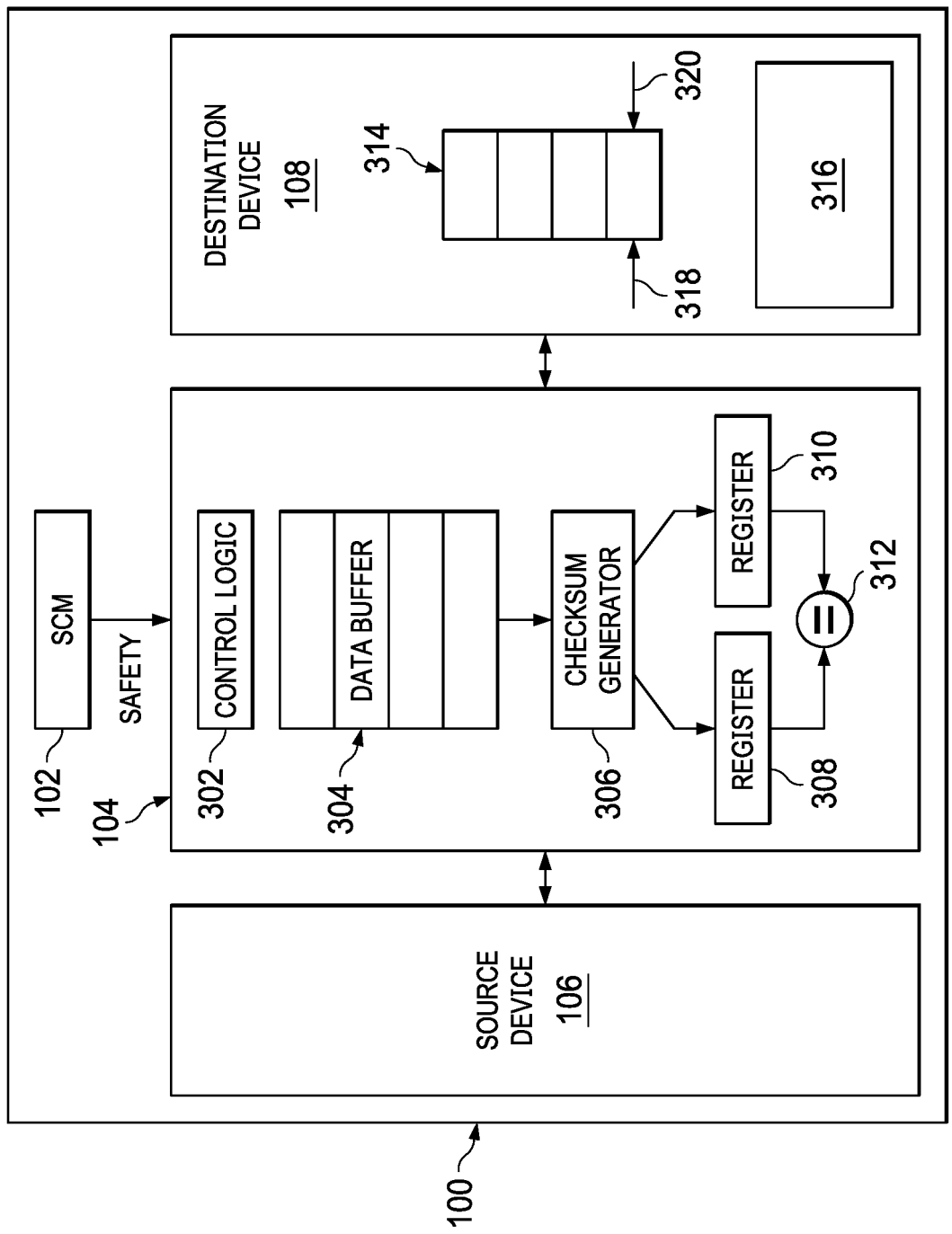
FIG. 3 is a block diagram of a data transfer system in accordance with various examples.

FIG. 3 is an implementation of the system 100 in which the source device 106 is a memory device and the destination device 108 is a peripheral device in accordance with various examples. For example, the source device 106 may be flash memory, RAM memory, or any other suitable memory device. The destination device 108 may be a peripheral device, such as, in one example, a DAC. In at least some examples, the DMA 104 includes control logic 302, a data buffer 304, a checksum generator 306, a register 308, a register 310, and comparison logic 312.

In an example of operation of the system 100 according to the implementation of FIG. 3, the DMA 104 reads data from the source device 106 and performs data integrity verification. The DMA 104 may read the data from the source device 106 and perform the data integrity verification in a manner substantially the same as described above with respect to FIG. 2, the description of which is not repeated herein.

Responsive to determining that the copying operation from the source device 106 to the data buffer 304 passed the data integrity verification, the control logic 302 may copy the contents of the data buffer 304 to the destination device 108. The destination device 108, in at least some examples, includes a FIFO buffer 314. The FIFO buffer 314 includes a write pointer 318 and a verify pointer 320. The FIFO buffer 314 may also include buffer logic 316 configured to control the write pointer 318 and the verify pointer 320. As used herein, a pointer may be an internal register that stores an index value that identifies a memory address of a memory (such as a buffer) to which the pointer corresponds or is otherwise assigned. The write pointer 318 may indicate a memory address in the FIFO buffer 314 at which a next data item received by the FIFO buffer 314 is to be written or stored. After writing to a memory address indicated by the write pointer 318, the write pointer 318 may be increased in value to a memory address of a next unused portion of the FIFO buffer 314. The verify pointer 320 may indicate a memory address in the FIFO buffer 314 that is to be read first during a verify-read operation. For example, at the beginning of a copying operation while the safety active signal is asserted, the write pointer 318 and the verify pointer 320 may both indicate a same memory address. As data is copied from the data buffer 304 to the FIFO buffer 314, the write pointer 318 increases in value such that the write pointer 318 and the verify pointer 320 no longer indicate the same memory address. After copying the data from the data buffer 304 to the FIFO buffer 314, the DMA 104 may initiate the data integrity verification with the verify-read operation. During the verify-read operation, the DMA 104 reads data from the FIFO buffer 314 and stores the read data back to the data buffer 304. In at least some examples, the data read by the DMA 104 is indicated by the verify pointer 320. Accordingly, after data is read by the DMA 104 from a memory address indicated by the verify pointer 320, the verify pointer 320 increments to a next memory address. In this way, in at least some examples at a conclusion of the verify-read operation, the write pointer 318 and the verify pointer 320 may again both indicate a same memory address. In other examples, the write pointer 318 and the verify pointer 320 may not indicate a same memory address. For example, the DMA 104 may fail to initiate the verify-read operation, which may cause the verify pointer 320 to not advance to indicate the same memory address as the write pointer 318. For example, following receipt by the buffer logic 316 of an instruction to perform write operation from the DMA 104, the buffer logic 316 may receive an instruction to perform a second write operation before receiving an instruction to perform a verify-read operation. In such examples, the buffer logic 316 may provide a fault notification to the DMA 104, or to any other suitable device, indicating that the verify-read operation was not performed.

In at least some examples, the destination device 108 receives data from the DMA 104 in an encoded format. The encoded format may include both instructions and data. The instructions may be, for example, a WRITE instruction to cause the destination device 108 to write the data to the FIFO buffer 314 at a position indicated by the write pointer 318, as well as the data to write to the FIFO buffer 314. In another example, the instruction may be a VERIFY-READ instruction to cause the destination device 108 to read data from the FIFO buffer 314 at a position indicated by the verify pointer 320, and provide the read data to the DMA 104. In at least some examples, the buffer logic 316 controls a memory address indicated by the write pointer 318 and the verify pointer 320 at least partially based on WRITE and VERIFY-READ.

After the data from the destination device 108 (e.g., such as stored in the FIFO buffer 314) is copied back to the data buffer 304, the control logic 302 may control the checksum generator 306 to generate and provide a checksum of the contents of the data buffer 304. The control logic 302 may also control the register 310 to store the checksum provided by the checksum generator 306, overwriting any data previously stored in the register 310. Following storing of the checksum in the register 310, the control logic 302 may control the comparison logic 312 to compare values stored and provided by the register 308 and the register 310 to perform data integrity verification. For example, the register 308 may contain a checksum of data copied from the source device 106 to the data buffer 304 during a copying operation and the register 310 may contain a checksum of data copied from the destination device 108 to the data buffer 304 during a verify-read operation. If an error has occurred in the copying or a fault exists in the destination device 108 or the DMA 104, the checksum values may not match. Responsive to the checksum values stored by the register 308 and the register 310 matching, the comparison logic 312 provides a comparison result indicating a match (e.g., a "pass" of the data integrity verification). Responsive to the checksum values stored by the register 308 and the register 310 not matching, the comparison logic 312 provides a comparison result indicating no match (e.g., a "fail" of the data integrity verification). The comparison result may be provided by the DMA 104 as a fault notification to any suitable component as dictated by specifications of the functional safety environment in which the system 100 is implemented. In various examples, the fault notification may cause a device or component receiving the fault notification to take remedial action, such as causing the DMA 104 to perform the copy operation again, ceasing operation of a system or device (e.g., such as a partial or full system shutdown), providing a notification to a user, etc.

In some examples, data may be subsequently read, responsive to a read request, from the destination device 108 after a verify-read operation has been performed, such as by the DMA 104 or by any other suitable component. In such examples, the buffer logic 316 may provide data from the FIFO buffer 314 responsive to the read request based on a memory location of the FIFO buffer 314 indicated by the verify-read pointer 320. Providing the data based on a memory location of the FIFO buffer 314 indicated by the verify-read pointer 320 may, in some examples, provide data that has undergone the verify-read operation described herein, increasing confidence in accuracy of the read data.

Figure 4:
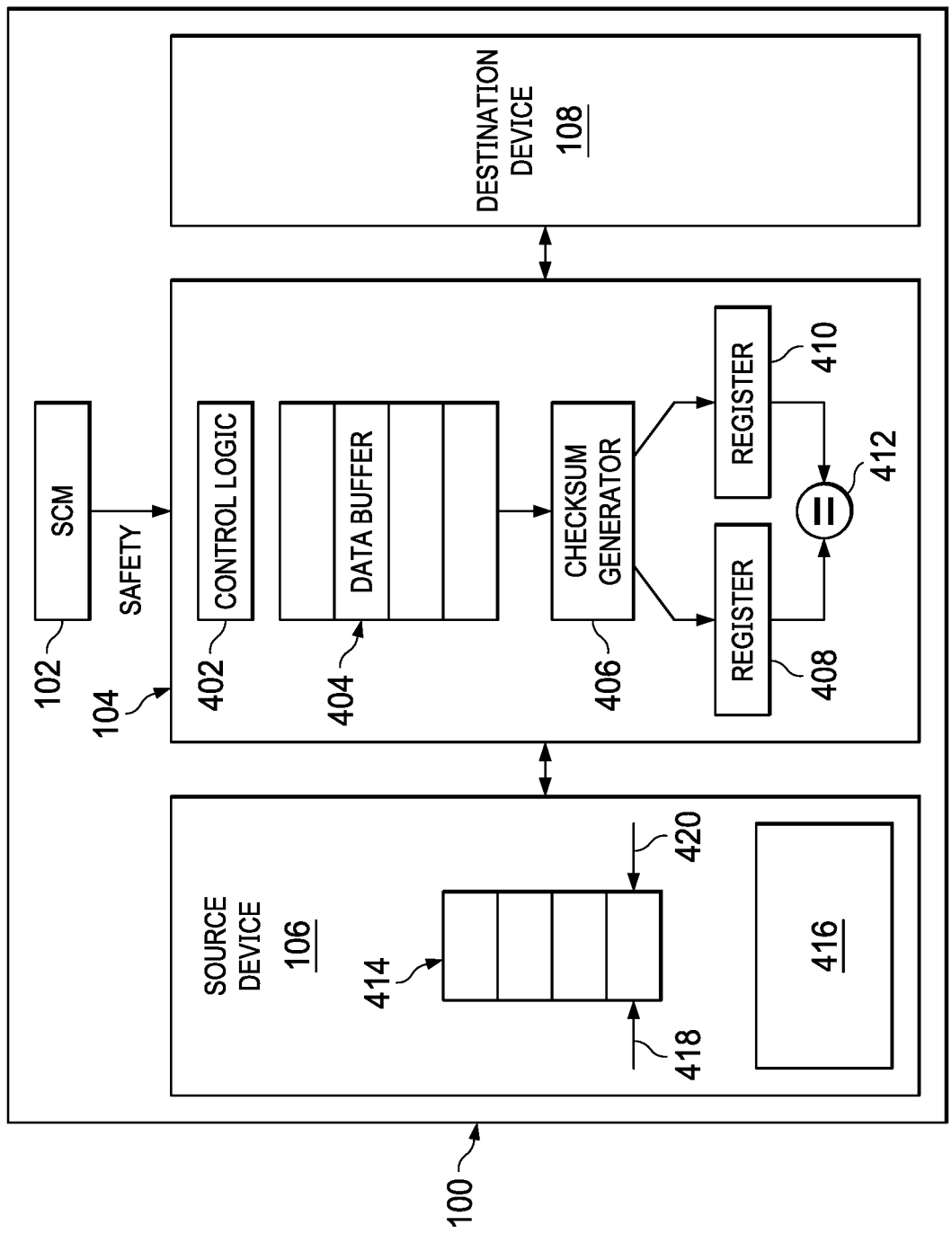
FIG. 4 is a block diagram of a data transfer system in accordance with various examples.

FIG. 4 is an implementation of the system 100 in which the source device 106 is a peripheral device and the destination device 108 is a memory device in accordance with various examples. For example, the source device 106 may be a peripheral device, such as, in one example, an ADC. The destination device 108 may be flash memory, RAM memory, or any other suitable memory device. In at least some examples, the DMA 104 includes control logic 402, a data buffer 404, a checksum generator 406, a register 408, a register 410, and comparison logic 412.

In an example of operation of the system 100 according to the implementation of FIG. 4, the DMA 104 reads data from the source device 106. The DMA 104 may read the data from the source device 106 responsive to the DMA 104 receiving a request, from the SCM 102 or any other suitable component (not shown) to copy data from the source device 106 to the destination device 108. The source device 106, in at least some examples, includes a FIFO buffer 414. The FIFO buffer 414 includes a read pointer 418 and a verify pointer 420. The FIFO buffer 414 may also include buffer logic 416 configured to control the read pointer 420 and the verify pointer 420. The read pointer 418 may indicate a memory address in the FIFO buffer 414 from which data should be read next in response to a received read request. After reading from the memory address indicated by the read pointer 418, the read pointer 418 may be increased in value to a next memory address of the FIFO buffer 414.

The read data may be stored in the data buffer 404 in a copying operation. After the data from the source device 106 (e.g., from the FIFO buffer 414) is copied to the data buffer 404, the control logic 402 may control the checksum generator 406 to generate and provide a checksum of the contents of the data buffer 404. The control logic 402 may also control the register 408 to store the checksum provided by the checksum generator 406. In various examples, the checksum generator 406 may be any hardware component or circuit suitable for, and capable of, generating and providing a checksum of received data, the scope of which is not limited herein.

The verify pointer 420 may indicate a memory address in the FIFO buffer 414 that is to be read first during a verify-read operation. For example, at the beginning of a copying operation while the safety active signal is asserted, the read pointer 418 and the verify pointer 420 may both indicate a same memory address. As data is copied from the FIFO buffer 414 to the data buffer 404, the read pointer 418 increases in value such that the read pointer 418 and the verify pointer 420 no longer indicate the same memory address. After copying the data from the FIFO buffer 414 to the data buffer 404, the DMA 104 may initiate the data integrity verification with the verify-read operation. During the verify-read operation, the DMA 104 reads data from the FIFO buffer 414 and again stores the read data to the data buffer 404. In at least some examples, the data read by the DMA 104 is indicated by the verify pointer 420. Accordingly, after data is read by the DMA 104 from a memory address indicated by the verify pointer 420, the verify pointer 420 increments to a next memory address. In this way, in at least some examples at a conclusion of the verify-read operation, the read pointer 418 and the verify pointer 420 may again both indicate a same memory address. In other examples, the read pointer 418 and the verify pointer 420 may not indicate a same memory address. For example, the DMA 104 may fail to initiate the verify-read operation, which may cause the verify pointer 420 to not advance to indicate the same memory address as the read pointer 418. For example, following receipt by the buffer logic 416 of an instruction to perform read operation from the DMA 104, the buffer logic 416 may receive an instruction to perform a second read operation before receiving an instruction to perform a verify-read operation. In such examples, the buffer logic 416 may provide a fault notification to the DMA 104, or to any other suitable device, indicating that the verify-read operation was not performed.

After the data from the source device 106 (e.g., such as stored in the FIFO buffer 414) is again copied to the data buffer 404, the control logic 402 may control the checksum generator 406 to generate and provide a checksum of the contents of the data buffer 404. The control logic 402 may also control the register 410 to store the checksum provided by the checksum generator 406, overwriting any data previously stored in the register 410. Following storing of the checksum in the register 410, the control logic 402 may control the comparison logic 412 to compare values stored and provided by the register 408 and the register 410 to perform data integrity verification. For example, the register 408 may contain a checksum of data copied from the source device 106 to the data buffer 404 during a copying operation and the register 410 may contain a checksum of data copied from the source device 106 to the data buffer 404 during a verify-read operation. If an error has occurred in the copying or a fault exists in the source device 106 or the DMA 104, the checksum values may not match. Responsive to the checksum values stored by the register 408 and the register 410 matching, the comparison logic 412 provides a comparison result indicating a match (e.g., a "pass" of the data integrity verification). Responsive to the checksum values stored by the register 408 and the register 410 not matching, the comparison logic 412 provides a comparison result indicating no match (e.g., a "fail" of the data integrity verification). The comparison result may be provided by the DMA 104 as a fault notification to any suitable component as dictated by specifications of the functional safety environment in which the system 100 is implemented. In various examples, the fault notification may cause a device or component receiving the fault notification to take remedial action, such as causing the DMA 104 to perform the copy operation again, ceasing operation of a system or device (e.g., such as a partial or full system shutdown), providing a notification to a user, etc.

In an example of operation of the system 100 according to the implementation of FIG. 4, responsive to verification of the copy operation from the source device 106 to the DMA 104 (e.g., passage of the data integrity verification), the DMA 104 writes data to the destination device 108 from the data buffer 304 and again performs data integrity verification. The DMA 104 may write the data to the destination device 108 and perform the data integrity verification in a manner substantially the same as described above with respect to FIG. 2, the description of which is not repeated herein.

Figure 5:
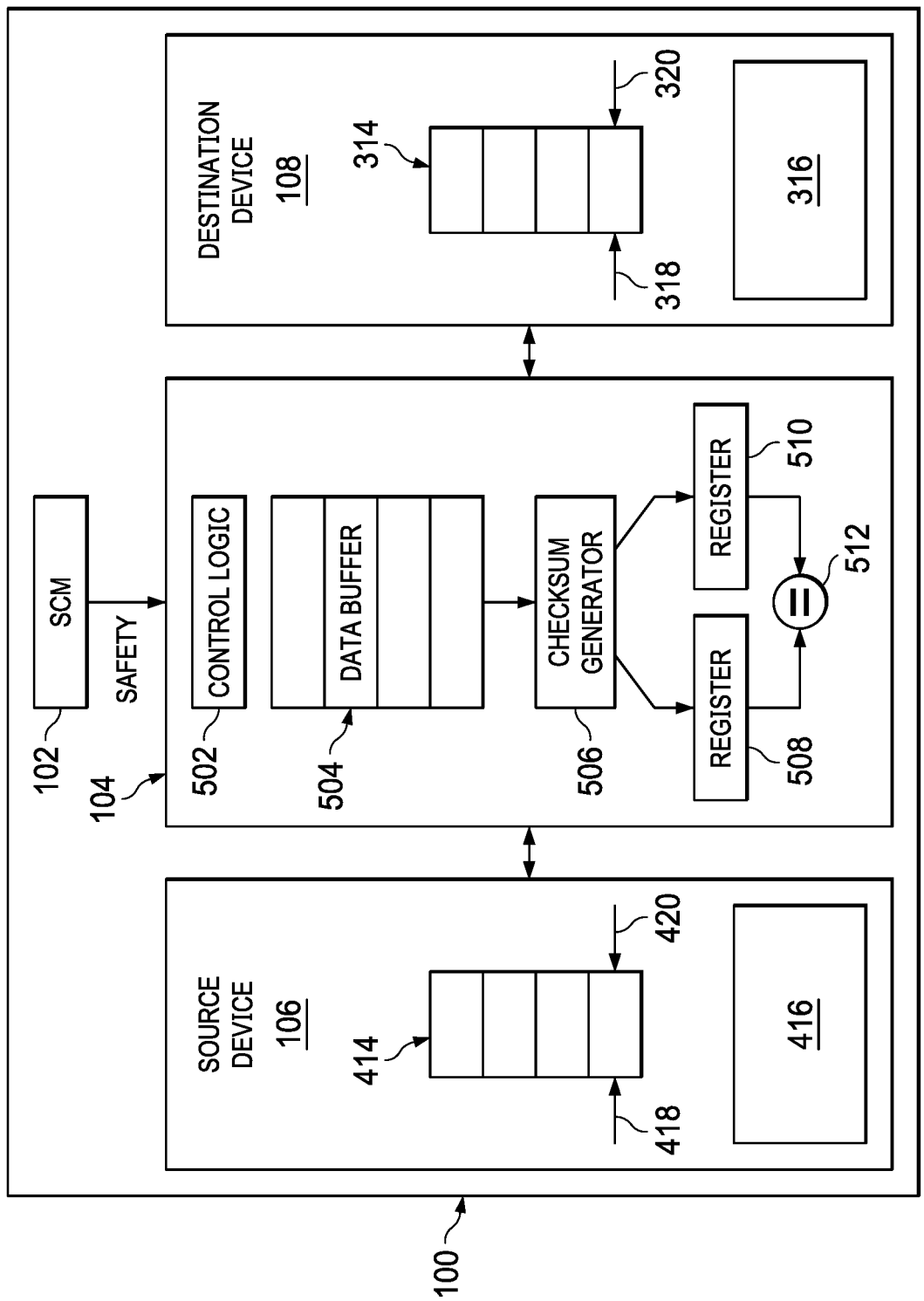
FIG. 5 is a block diagram of a data transfer system in accordance with various examples.

FIG. 5 is an implementation of the system 100 in which the source device 106 is a peripheral device and the destination device 108 is a peripheral device in accordance with various examples. For example, the source device 106 may be a peripheral device, such as, in one example, an ADC. The destination device 108 may be a peripheral device, such as, in one example, a DAC. In at least some examples, the DMA 104 includes control logic 502, a data buffer 504, a checksum generator 506, a register 508, a register 510, and comparison logic 512.

In an example of operation of the system 100 according to the implementation of FIG. 5, the DMA 104 reads data from the source device 106 and performs data integrity verification. The DMA 104 may read the data from the source device 106 and perform the data integrity verification in a manner substantially the same as described above with respect to FIG. 4, the description of which is not repeated herein. Similarly, responsive to verification of the copy operation from the source device 106 to the DMA 104 (e.g., passage of the data integrity verification), the DMA 104 writes data to the destination device 108 from the data buffer 504 and again performs data integrity verification. The DMA 104 may write the data to the destination device 108 and perform the data integrity verification in a manner substantially the same as described above with respect to FIG. 3, the description of which is not repeated herein.

Figure 6:
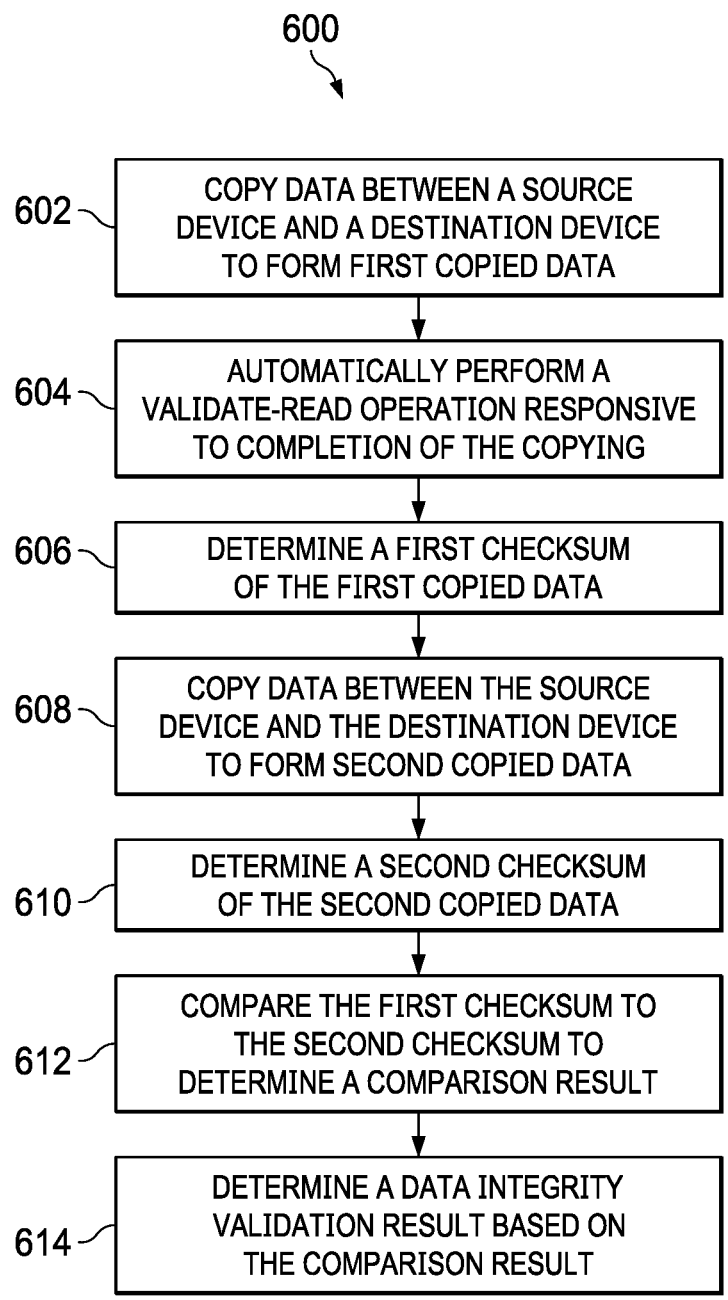
FIG. 6 is a flowchart of a method for data integrity verification in accordance with various examples.

FIG. 6 is a flowchart of a method 600 in accordance with various examples. The method 600 may provide for copying of data between first and second devices and verification of that copying by performing a verify-read operation, as described above. In at least some examples, the method 600 is implemented, at least in part, by the DMA 104 as described above with respect to any of the preceding figures. Accordingly, reference may be made in describing the method 600 to components described above with respect to any of the preceding figures.

At operation 602, data is copied between a source device and a destination device. The copied data may form first copied data. In some examples, the source device is a peripheral device or a memory device, as described above herein, and the destination device is the DMA 104. In other examples, the source device is the DMA 104 and the destination device is a peripheral device or a memory device, as described above herein.

At operation 604, a verify-read operation is automatically performed, responsive to completion of the copying. The verify-read operation may be performed by the DMA 104 automatically, as defined above herein, upon completion of the copying to form the first copied data. Accordingly, the DMA 104 may perform the copy of the data described at operation 602 and the verify-read operation described at operation 604 and subsequent operations 606-614 in response to a single instruction. The verify-read operation may verify or validate accuracy of the first copied data, as stored in the destination device.

At operation 606, as a function of the verify-read operation, a first checksum of the first copied data is determined. In at least some examples, the first checksum is determined by the DMA 104 according to any suitable means.

At operation 608, as a function of the verify-read operation, data is copied between the source device and the destination device to form second copied data. In examples in which the destination device is the DMA 104, the data is copied from the source device to the DMA 104 to form the second copied data. In examples in which the source device is the DMA 104, the data is copied from the destination device to the DMA 104 to form the second copied data.

At operation 610, as a function of the verify-read operation, a second checksum of the second copied data is determined. In at least some examples, the second checksum is determined by the DMA 104 according to any suitable means.

At operation 612, as a function of the verify-read operation, the first checksum is compared to the second checksum to determine a comparison result. In at least some examples, the DMA 104 performs the comparison.

At operation 614, as a function of the verify-read operation, a data integrity validation result is determined based on the comparison result. For example, the data integrity validation result may have a value of pass, or other affirmative value, responsive to the comparison result indicating a match between the first checksum and the second checksum. In another examples, the data integrity validation result may have a value of fail, or other negative value, responsive to the comparison result indicating no match between the first checksum and the second checksum.

Figure 7:
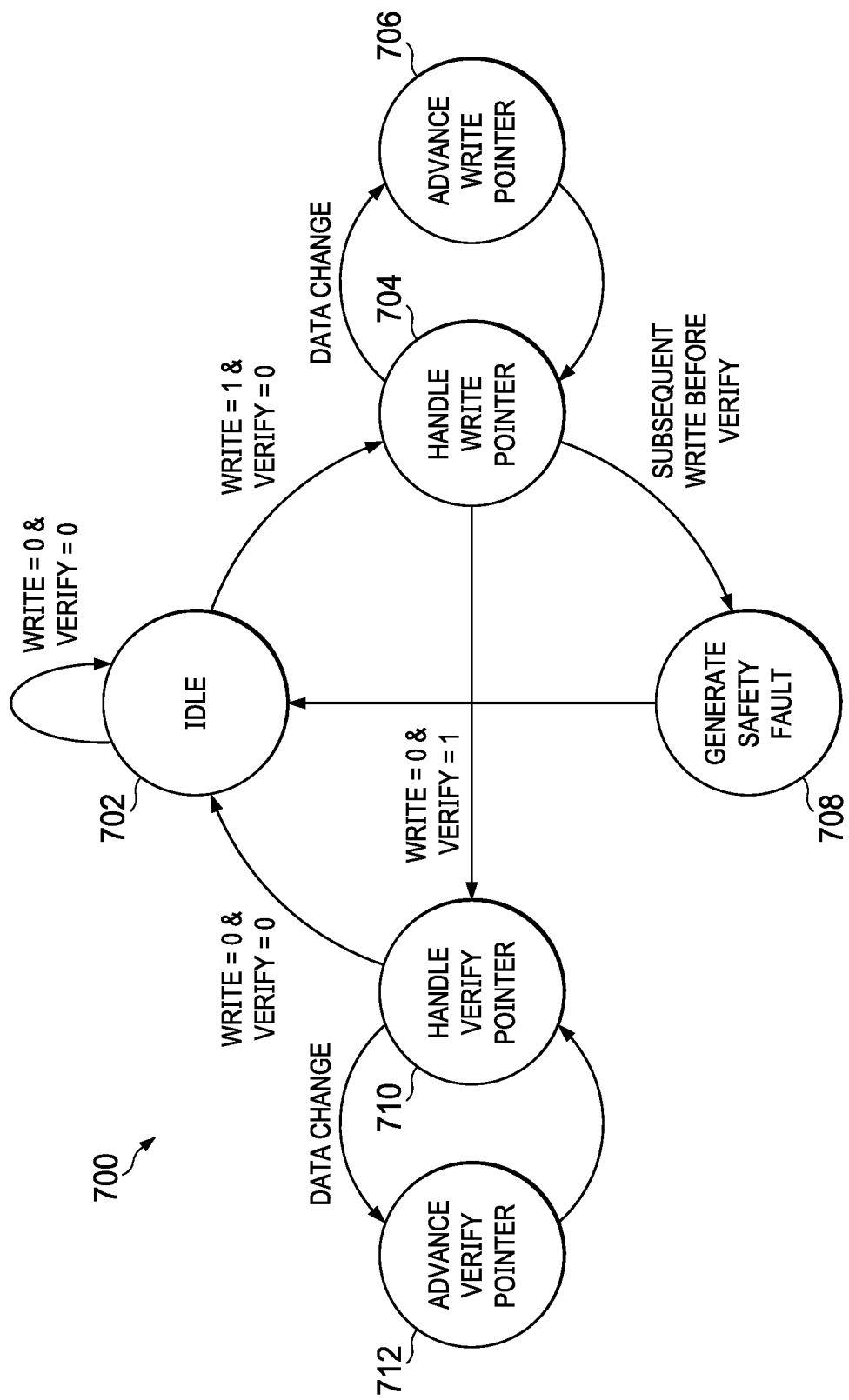
FIG. 7 is a state diagram for data integrity verification in accordance with various examples.

FIG. 7 is a state diagram 700 in accordance with various examples. In at least some examples, the diagram 700 corresponds to a state machine implemented by the buffer logic 316, as described above with respect to FIG. 3. For example, based on the state machine configured to operate according to the diagram 700, the buffer logic 316 is configured to control the write pointer 318 and the verify pointer 320. All operations of the diagram 700 are under an operational assumption that the safety active signal (shown in FIG. 7 as "SAFETY") is asserted.

At a state 702, the buffer logic 316 is idle. For example, responsive to receipt of WRITE and VERIFY-READ each having de-asserted values (e.g., such as a logical low or binary "0" value), the buffer logic 316 may remain idle and the write pointer 318 and verify pointer 320 may remain unchanged. Responsive to receipt of WRITE having an asserted value while VERIFY-READ maintains a de-asserted value, the buffer logic 316 transitions to state 704.

At state 704, the buffer logic 316 handles the write pointer 318. For example, at state 704 the buffer logic 316 may monitor the FIFO buffer 314, waiting for data to be written to the FIFO buffer 314. In at least some examples, the buffer logic 316 may determine that data is being written to the FIFO buffer 314 based on detection of WRITE having an asserted value. Responsive to data being written to the FIFO buffer 314, the buffer logic 316 transitions to state 706, advances the write pointer 318 to a next unused memory address of the FIFO buffer 314, and returns to state 704.

At state 708, the buffer logic 316 provides a fault notification message. In at least some examples, the fault notification message provided at state 708 indicates that a DMA from which data was received by the FIFO buffer 314 did not perform data integrity verification subsequent to performing the write and prior to performing a next write. From state 708, the buffer logic 316 returns to state 702.

Returning to state 704, responsive to receipt of WRITE having a de-asserted value and VERIFY-READ having an asserted value, the buffer logic 316 transitions to state 710. At state 710, the buffer logic 316 handles the verify pointer 320. For example, at state 710 the buffer logic 316 may monitor the FIFO buffer 314, waiting for data to be read from the FIFO buffer 314. In at least some examples, the buffer logic 316 may determine that data is being read from the FIFO buffer 314 based on detection of VERIFY having an asserted value. Responsive to a change in data (e.g., reading of data from the FIFO buffer 314), the buffer logic 316 transitions to state 712, advances the verify pointer 320 to a next memory address of the FIFO buffer 314, and returns to state 710. Responsive to receipt of WRITE having a de-asserted value and VERIFY-READ having a de-asserted value, the buffer logic 316 returns to state 702.

Figure 8:
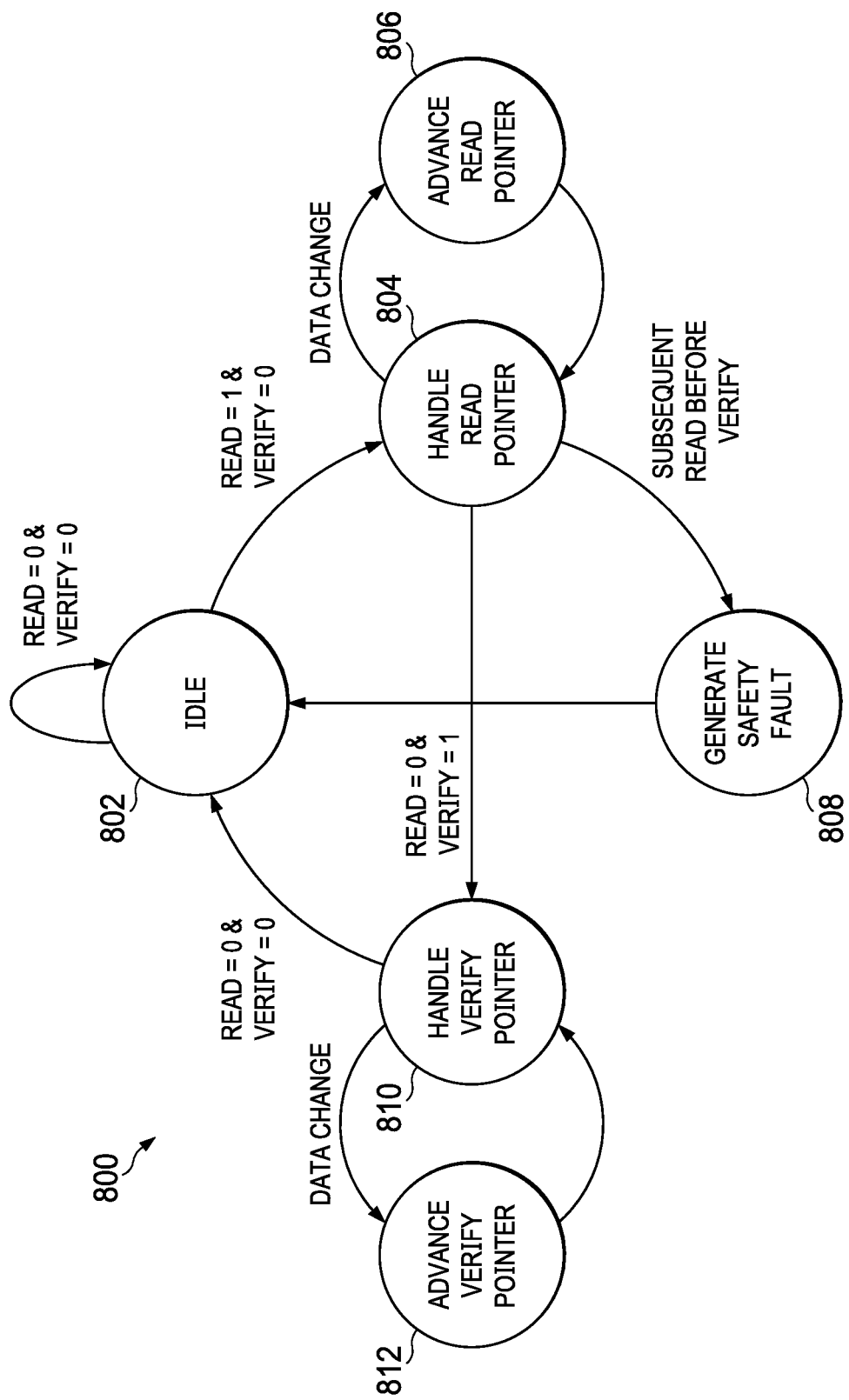
FIG. 8 is a state diagram for data integrity verification in accordance with various examples.

FIG. 8 is a state diagram 800 in accordance with various examples. In at least some examples, the diagram 800 corresponds to a state machine implemented by the buffer logic 416, as described above with respect to FIG. 4. For example, based on the state machine configured to operate according to the diagram 800, the buffer logic 416 is configured to control the read pointer 418 and the verify pointer 420. All operations of the diagram 800 are under an operational assumption that the safety active signal (shown in FIG. 8 as "SAFETY") is asserted.

At a state 802, the buffer logic 416 is idle. For example, responsive to receipt of READ and VERIFY-READ each having de-asserted values (e.g., such as a logical low or binary "0" value), the buffer logic 416 may remain idle and the read pointer 418 and verify pointer 420 may remain unchanged. Responsive to receipt of READ having an asserted value while VERIFY-READ maintains a de-asserted value, the buffer logic 416 transitions to state 804.

At state 804, the buffer logic 416 handles the read pointer 418. For example, at state 804 the buffer logic 416 may monitor the FIFO buffer 414, waiting for data to be read from the FIFO buffer 414. In at least some examples, the buffer logic 416 may determine that data is being read from the FIFO buffer 414 based on detection of READ having an asserted value. Responsive to a change in data (e.g., reading of data to the FIFO buffer 414), the buffer logic 416 transitions to state 806, advances the read pointer 418 to a next memory address of the FIFO buffer 414, and returns to state 804. After having received READ having an asserted values, responsive to a subsequent receipt of READ having an asserted value without first receiving VERIFY-READ having an asserted value, the buffer logic 416 transitions to state 808.

At state 808, the buffer logic 416 provides a fault notification message. In at least some examples, the fault notification message provided at state 808 indicates that a DMA which read data from the FIFO buffer 414 did not perform data integrity verification subsequent to the read and before performing a next read. From state 808, the buffer logic 416 returns to state 802.

Returning to state 804, responsive to receipt of READ having a de-asserted value and VERIFY-READ having an asserted value, the buffer logic 416 transitions to state 810. At state 810, the buffer logic 816 handles the verify pointer 420. For example, at state 810 the buffer logic 416 may monitor the FIFO buffer 414, waiting for data to be read from the FIFO buffer 414. In at least some examples, the buffer logic 416 may determine that data is being read from the FIFO buffer 414 based on detection of VERIFY having an asserted value. Responsive to a change in data (e.g., reading of data from the FIFO buffer 414), the buffer logic 416 transitions to state 812, advances the verify pointer 420 to a next memory address of the FIFO buffer 414, and returns to state 810. Responsive to receipt of READ having a de-asserted value and VERIFY-READ having a de-asserted value, the buffer logic 416 returns to state 802.

In this description, the term "couple" may cover connections, communications or signal paths that enable a functional relationship consistent with this description. For example, if device A provides a signal to control device B to perform an action, then: (a) in a first example, device A is directly coupled to device B; or (b) in a second example, device A is indirectly coupled to device B through intervening component C if intervening component C does not substantially alter the functional relationship between device A and device B, so device B is controlled by device A via the control signal provided by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. Circuits described herein are reconfigurable to include the replaced components to provide functionality at least partially similar to functionality available prior to the component replacement. Unless otherwise stated, "about," "approximately," or "substantially" preceding a value means+/−10 percent of the stated value.

Modifications are possible in the described examples, and other examples are possible within the scope of the claims.

What is claimed is:

1. An apparatus, comprising:
 a direct memory access (DMA) component comprising a data buffer, wherein the DMA component is configured to:
  transfer a first copy of data from a first device to the data buffer to form first stored data;
  determine a first value based on the first stored data;
  transfer a second copy of the data from the first device to the data buffer to form second stored data;
  determine a second value based on the second stored data; and
  determine a first result of data integrity validation based on the first value and the second value.

2. The apparatus of claim 1, wherein to determine the first result of data integrity validation, the DMA component is configured to:
 compare the first value to the second value to determine a comparison result indicating whether the first value matches the second value; and
 determine the first result of data integrity validation based on the comparison result.

3. The apparatus of claim 1, wherein the first value is a checksum of the first stored data, and the second value is a checksum of the second stored data.

4. The apparatus of claim 1,
 wherein the DMA component is configured to receive a signal requesting for the data integrity validation, and
 wherein the DMA component is configured to, in response to the signal, determine the first value based on the first stored data, transfer the second copy of the data from the first device to the data buffer to form the second stored data, determine the second value based on the second stored data, and determine the first result of data integrity validation based on the first value and the second value.

5. The apparatus of claim 1, wherein the second stored data overwrites the first stored data.

6. The apparatus of claim 1,
 wherein the first device is a memory device, or a peripheral device of the apparatus, and
 wherein the peripheral device comprises a first-in first-out (FIFO) buffer, wherein a first pointer of the FIFO buffer indicates a first memory address of the FIFO buffer associated with transferring the first copy of the data from the peripheral device to the data buffer of the DMA component, and wherein a second pointer of the FIFO buffer indicates a second memory address of the FIFO buffer associated with transferring the second copy of the data from the peripheral device to the data buffer of the DMA component.

7. The apparatus of claim 1, wherein the DMA component is configured to:
 transfer one of the first or second stored data from the data buffer of the DMA component to a second device to form third stored data;
 transfer a copy of the third stored data from the second device to the data buffer to form fourth stored data;
 determine a third value based on the fourth stored data; and
 determine a second result of data integrity validation based on the third value and one of the first or second values.

8. The apparatus of claim 7, wherein the fourth stored data overwrites the one of the first or second stored data.

9. The apparatus of claim 7,
 wherein the second device is a memory device, or a peripheral device of the apparatus, and
 wherein the peripheral device comprises a first-in first-out (FIFO) buffer, wherein a first pointer of the FIFO buffer indicates a first memory address of the FIFO buffer associated with providing the one of the first or second stored data from the data buffer of the DMA component to the peripheral device, and wherein a second pointer of the FIFO buffer indicates a second a memory address of the FIFO buffer associated with transferring the copy of the third stored data from the peripheral device to the data buffer of the DMA component.

10. A system, comprising:
 a system control component; and
 a direct memory access (DMA) component coupled to and controlled by the system control component, wherein under control of the system control component, the DMA component is configured to:
  transfer a first copy of data from a first device to a data buffer of the DMA component to form first stored data;
  determine a first value based on the first stored data;
  transfer a second copy of the data from the first device to the data buffer of the DMA component to form second stored data;
  determine a second value based on the second stored data; and
  determine a first result of data integrity validation based on the first value and the second value.

11. The system of claim 10, wherein to determine the first result of data integrity validation, the DMA component is configured to:
 compare the first value to the second value to determine a comparison result indicating whether the first value matches the second value; and
 determine the first result of data integrity validation based on the comparison result.

12. The system of claim 10, wherein the first value is a checksum of the first stored data, and the second value is a checksum of the second stored data.

13. The system of claim 10,
 wherein the DMA component is configured to receive a signal requesting for the data integrity validation, and
 wherein the DMA component is configured to, in response to the signal, determine the first value based on the first stored data, transfer the second copy of the data from the first device to the data buffer to form the second stored data, determine the second value based on the second stored data, and determine the first result of data integrity validation based on the first value and the second value.

14. The system of claim 10, wherein the second stored data overwrites the first stored data.

15. The system of claim 10,
 wherein the first device is a memory device, or a peripheral device of the system, and
 wherein the peripheral device comprises a first-in first-out (FIFO) buffer, wherein a first pointer of the FIFO buffer indicates a first memory address of the FIFO buffer associated with transferring the first copy of the data from the peripheral device to the data buffer of the DMA component, and wherein a second pointer of the FIFO buffer indicates a second memory address of the FIFO buffer associated with transferring the second copy of the data from the peripheral device to the data buffer of the DMA component.

16. The system of claim 15, wherein the peripheral device comprises an analog-to-digital converter (ADC).

17. The system of claim 10, wherein the DMA component is configured to:
  transfer one of the first or second stored data from the data buffer of the DMA component to a second device to form third stored data;
  transfer a copy of the third stored data from the second device to the data buffer to form fourth stored data;
  determine a third value based on the fourth stored data; and
  determine a second result of data integrity validation based on the third value and one of the first or second values.

18. The system of claim 17, wherein the fourth stored data overwrites the one of the first or second stored data.

19. The system of claim 17,
  wherein the second device is a memory device, or a peripheral device of the system, and
  wherein the peripheral device comprises a first-in first-out (FIFO) buffer, wherein a first pointer of the FIFO buffer indicates a first memory address of the FIFO buffer associated with providing the one of the first or second stored data from the data buffer of the DMA component to the peripheral device, and wherein a second pointer of the FIFO buffer indicates a second a memory address of the FIFO buffer associated with transferring the copy of the third stored data from the peripheral device to the data buffer of the DMA component.

20. The system of claim 19, wherein the peripheral device comprises a digital-to-analog converter (ADC).

* * * * *